T. C. OLIVER.
METHOD AND APPARATUS FOR CONCENTRATING LIQUIDS.
APPLICATION FILED FEB. 7, 1917.
1,240,591.
Patented Sept. 18, 1917.
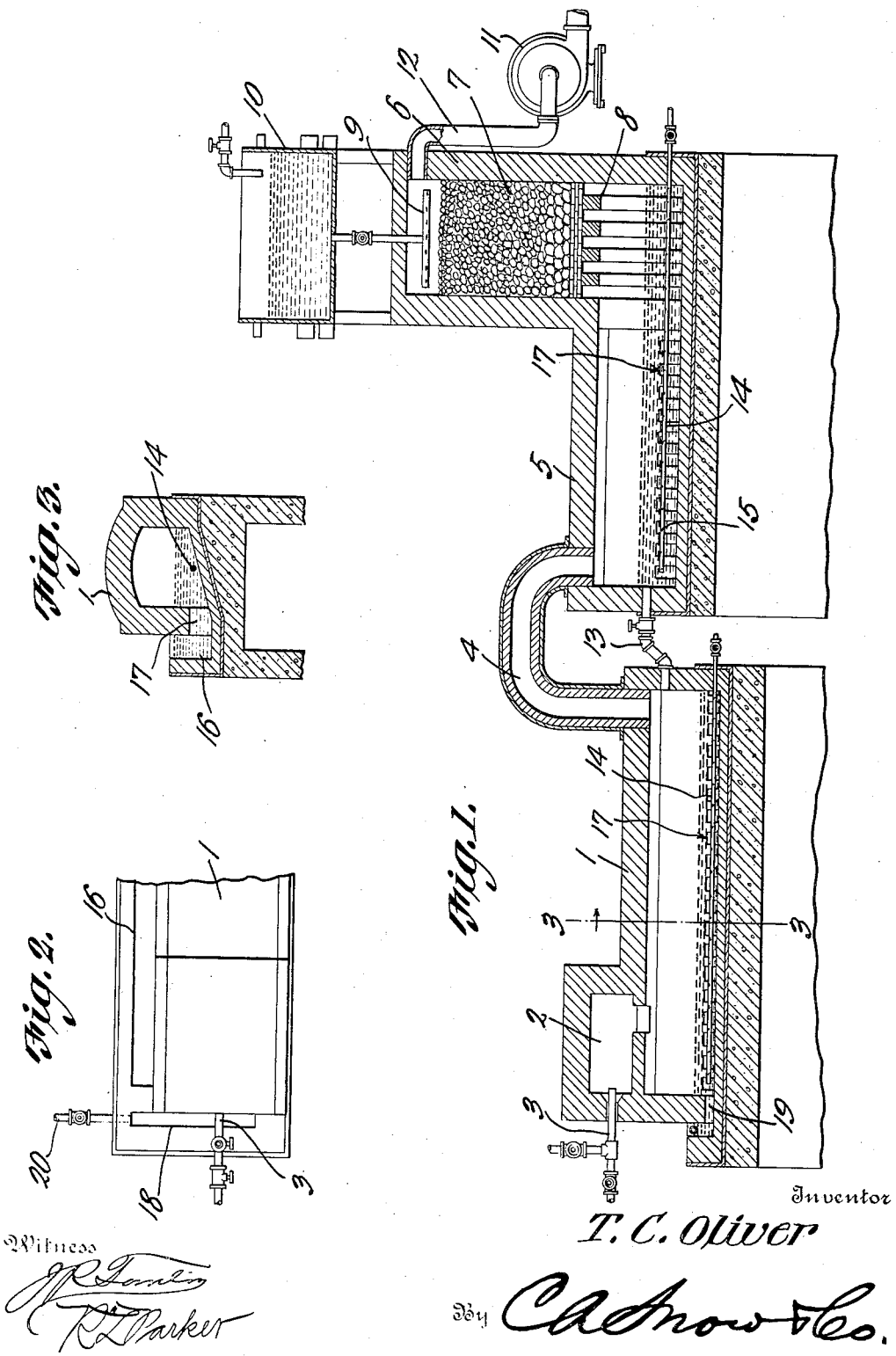

UNITED STATES PATENT OFFICE.

THOMAS C. OLIVER, OF CHARLOTTE, NORTH CAROLINA.

METHOD AND APPARATUS FOR CONCENTRATING LIQUIDS.

1,240,591.  Specification of Letters Patent.  Patented Sept. 18, 1917.

Application filed February 7, 1917. Serial No. 147,202.

*To all whom it may concern:*

Be it known that I, THOMAS C. OLIVER, a citizen of the United States, residing at Charlotte, in the county of Mecklenburg and State of North Carolina, have invented a new and useful Method and Apparatus for Concentrating Liquids, of which the following is a specification.

This invention relates to a method of and apparatus for concentrating liquids and is designed more particularly as an improvement upon the method and apparatus disclosed in Patent No. 1,195,075, issued to me on August 15, 1916.

Some liquids to be concentrated for commercial purposes, whether of a neutral, alkali or acid nature, contain solids either in solution or suspension and which will precipitate in the course of concentration or else crystallize. Crystals or precipitates produced in the course of evaporation of liquid should of course be removed and one of the objects of the present invention is to provide simple and efficient means whereby such solids may be conveniently removed and the efficiency of the concentrating apparatus maintained at its maximum.

It might be stated by way of example that in the concentration of sulfuric acid solution, which often contains in solution metal sulfate such as iron sulfate, zinc sulfate, aluminum sulfate, copper sulfate, titanium sulfate, etc., the sulfates will precipitate during the concentration and must be removed from the acid. For the purpose of enabling precipitates and like solid substances to be removed from the concentrated liquid the present apparatus has been devised.

With the foregoing and other objects in view, which will appear as the description of the invention proceeds, the invention consists in certain novel details of construction and combinations of parts and certain novel steps in the method of concentration which will be hereinafter more fully described and pointed out in the claims.

In the accompanying drawings the preferred form of the invention has been shown.

In said drawings:—

Figure 1 is a vertical longitudinal section through apparatus embodying the present improvements.

Fig. 2 is a plan view of one end portion of the apparatus.

Fig. 3 is a section on line 3—3 of Fig. 1.

Referring to the figures by characters of reference 1 designates the primary heating conduit or flue made of suitable heat and acid resisting material and which is provided, in the upper portion of one end with a combustion chamber 2 to which fuel may be supplied through a nozzle 3. Hot products of combustion are adapted to be directed from this combustion chamber into the flue or conduit 1 so as thus to flow over the liquid contents of the flue or conduit and into a flue 4 extending from the top of the flue or conduit at the end remote from the combustion chamber 2 and discharging into one end of a secondary flue or conduit 5 preferably arranged at a higher level than the conduit or flue 1. This secondary flue or conduit is in communication at one end with the pre-heating tower 6 having the usual filling 7 supported on arches 8. A spraying element 9 is arranged in the upper portion of the tower and is in communication with a tank 10 for holding the liquid to be concentrated. An exhaust fan indicated generally at 11 is in communication through a flue 12 with the upper portion of the tower 6 and is utilized for the purpose of withdrawing waste gases and vapors.

For the purpose of conveying liquid from the upper flue or conduit 5 to the lower or main flue or conduit a pipe 13 is provided, this pipe being preferably valved as shown and having its inlet end located at or below the level of the liquid in the conduit or flue 5, while its outlet end is above the level of the liquid in the main flue or conduit 1.

A pipe 14 is arranged longitudinally within each of the flues or conduits 1 and 5 below the surface of the liquid therein, each pipe being provided with a plurality of minute apertures. These apertures have been indicated at 15. Air or other cooling medium under pressure is adapted to be directed into the pipe and will issue in jets or bubbles through the openings 15 thus to keep the liquid contents of the flues or conduits agitated and chilled so that they will not become disintegrated by the intense heat to which they are subjected while in the process of concentration.

Arranged alongside of each of the flues or conduits is a trough 16 which communicates through ports 17 with the interior of the flue or conduit, the bottom of said flue or conduit being inclined downwardly toward these ports as shown particularly in Fig. 3, A separate trough 18 is provided at the discharge end of the main flue or conduit 1 and communicate with the interior of said flue or conduit through one or more ports 19. This trough 18 has an overflow pipe 20 through which the concentrated liquid may be withdrawn.

In operation, gaseous fuel is ignited in the combustion chamber 2 and the hot products of combustion pass over the liquid contained in the main conduit or flue 1 where concentration of the liquid takes place and the temperature of the gas and vapors is considerably reduced. From this flue or conduit 1, said gases and vapors pass through the flue 4 into the other unit of the concentrator where the liquid is concentrated and the temperature of the combustion gases and the vapors is still further reduced. From this flue or conduit 5 said gases and vapors pass up into the tower 6 where the liquid, which percolates through the packing material in the tower is preheated and the gases and vapors are withdrawn by the fan 11. Thus it will be seen that as the liquid is sprayed onto the packing in the tower it will be preheated, after which it will be concentrated to a certain extent within the flue or conduit 5 and will then flow through the pipe 13 into the flue or conduit 1 where concentration will be completed, the finished product being drawn off through pipe 20 from the trough 18. During the concentration the liquid is kept continually agitated by the air bubbles discharged from the orifices or apertures 15 in the pipes 14, thus preventing disintegration of the liquid by the intense heat to which it is subjected. These air bubbles also prevent the formation of solids on the surface of the liquid which would reduce the efficiency of the apparatus and render the evaporation less economical. Not only is the formation of a crust on the liquid thus prevented but any precipitates produced in the apparatus will gravitate along the inclined bottoms of the flues or conduits to the side troughs 16 from which they can be removed. Consequently the liquid in the flues or conduits 1 and 5 will be kept substantially clear of solids and the liquid, when delivered to the trough 18 will be pure and clear, containing only soluble parts. Importance is attached to the fact that the solids or precipitates can be removed without interfering with the concentration operation.

What is claimed is:—

1. Apparatus for use in concentrating liquids, including a flue or conduit having a side opening, a collecting trough outside of said flue or conduit and in communication with said opening, the bottom of the flue or conduit being inclined downwardly toward the opening, and means for directing a current of hot gases over liquid contained within said flue or conduit.

2. Apparatus for use in concentrating liquids, including a flue or conduit having a side opening, a collecting trough outside of said flue or conduit and in communication with said opening, the bottom of the flue or conduit being inclined downwardly toward the opening, means for directing a current of hot gases over liquid contained within said flue or conduit, and means for continuously agitating and cooling the liquid while subjected to the action of the gases.

3. Apparatus for concentrating liquids, including a liquid containing flue or conduit, means for directing hot gases over the liquid to concentrate the same, means for agitating the liquid to prevent the formation of a crust thereon, and means outside of the conduit for receiving precipitates from within the conduit.

4. Apparatus for concentrating liquids, including a flue or conduit for holding liquid to be concentrated, means for directing hot gases over the liquid for concentrating the same, means for deflecting precipitates laterally from the conduit, means outside of the conduit for receiving said precipitates, and means at one end of the conduit for receiving pure concentrated liquid therefrom.

5. Apparatus for concentrating liquid, including a liquid containing flue or conduit, means for concentrating the liquid in the flue or conduit, means for agitating the liquid to prevent the formation of a crust thereon, and means for collecting precipitates from within the conduit.

6. Apparatus for the concentration of liquid, including separate concentrating flues or conduits disposed at different elevations, means for directing hot gases over the liquid contents of the flues successively, means for conducting liquid from one flue to the other, a tower in communication with one of the flues, means for spraying liquid to be concentrated into the tower, means for exhausting waste gases and vapors from the tower, and means within each of the flues or conduits for cooling and agitating the liquid contents of the conduits and for preventing the formation of crust on said liquid contents.

7. Apparatus for the concentration of liquid, including separate concentrating flues or conduits disposed at different elevations, means for directing hot gases over the liquid contents of the flues successively, means for conducting liquid from one flue to the other, a tower in communication with one of the flues, means for spraying liquid to be concentrated into the tower, means for exhausting waste gases and vapors from the tower, means within each of the flues or conduits for cooling and agitating the liquid contents of the conduits and for preventing the formation of crust on said liquid contents, and means outside of and in communication with the interior of each flue or conduit for receiving precipitates from said flue or conduit.

8. Apparatus for use in the concentration of liquid, including a flue or conduit for holding liquid to be concentrated, means for directing hot products of combustion over the liquid within the flue, and a precipitate receiver along one side of the conduit, there being ports in the wall of the conduit and opening into the receiver, and the bottom of the conduit being inclined downwardly toward the ports.

9. The herein described method of removing precipitates from liquid being concentrated, which consists in subjecting the liquid to the action of an overlying current of hot gases, agitating the liquid to prevent the formation of a crust and to precipitate solids, produced by concentration, and removing precipitates by gravity from that portion of the liquid beneath the hot gases.

10. The herein described method of removing precipitates from liquid being concentrated, which consists in subjecting the liquid to the action of an overlying current of hot gases, agitating the liquid to prevent the formation of a crust and to precipitate solids produced by concentration, and removing precipitates laterally by gravity from under that portion of the liquid under the hot gases.

In testimony that I claim the foregoing as my own, I have hereto affixed my signature in the presence of two witnesses.

THOMAS C. OLIVER.

Witnesses:
ROBERT A. CANAVAN,
THOS. F. MAHER.